Patented Nov. 4, 1930

1,780,345

UNITED STATES PATENT OFFICE

MELVIN DE GROOTE, OF ST. LOUIS, LOUIS T. MONSON, OF MAPLEWOOD, AND ARTHUR F. WIRTEL, OF WEBSTER GROVES, MISSOURI, ASSIGNORS TO WM. S. BARNICKEL & COMPANY, OF WEBSTER GROVES, MISSOURI, A CORPORATION OF MISSOURI

PROCESS FOR BREAKING PETROLEUM EMULSIONS

No Drawing. Application filed January 21, 1929. Serial No. 334,108.

This invention relates to the treatment of emulsions of mineral oil and water, such as petroleum emulsions, for the purpose of separating the oil from the water.

Petroleum emulsions are of the water-in-oil type, and comprise fine droplets of naturally-occurring waters or brines, dispersed in a more or less permanent state throughout the oil which constitutes the continuous phase of the emulsion. They are obtained from producing wells and from the bottom of oil storage tanks and are commonly referred to as "cut oil", "roily oil", "emulsified oil", and "bottom settlings".

The object of our invention is to provide a novel and inexpensive process for separating emulsions of the character referred to into their component parts of oil and water or brine.

Briefly described, our process consists in subjecting a petroleum emulsion of the water-in-oil type to the action of a treating agent or demulsifying agent of the kind hereinafter described, thereby causing the emulsion to break down and separate into its component parts of oil and water or brine, when the emulsion is permitted to remain in a quiescent state after treatment.

The treating agent or demulsifying agent used in our process is a substituted aromatic detergent-forming sulfonic body of the type X F R $SO_3$ Z, wherein X stands for a polycyclic aromatic nucleus, F stands for a detergent-forming organic residue having at least twelve carbon atoms, and R stands for an alcohol residue derived from an alcohol having fewer than twelve carbon atoms in the molecule, $SO_3$ is the sulfonic residue and Z is an hydrogen ion equivalent of the kind subsequently defined.

As herein used, the term "detergent-forming group" is intended to indicate residues obtained from detergent-forming organic bodies. Detergent-forming organic bodies are of three classes, and include fatty materials, such as oleic acid, or olive oil, together with resinous materials, like rosin, and also petroleum acids, such as naphthenic acids or sulfonated petroleum bodies. These detergent-forming bodies are similar, in that they react with alkalis to give soap or soap-like bodies. In the previous paragraph, F has been used to designate the detergent-forming residue, and it is meant to designate the residue from any of the above-mentioned detergent-forming bodies when introduced into the aromatic nucleus, as will subsequently be described.

The introduction of the fatty group into the aromatic nucleus, together with a sulfonic group, is best exemplified in the Twitchell reagent, which is well known in industrial organic chemistry.

The use of a demulsifying agent for the resolution of petroleum emulsions of the water-in-oil type, consisting of a sulfo-aromatic compound of a fatty acid, comprising an aromatic sulfonc acid in which the fatty group was substituted in the aromatic nucleus is disclosed in U. S. Patent to W. S. Barnickel No. 1,467,831, dated Sept. 11, 1923. Similar material in which the fatty material was replaced by rosin is disclosed for a similar purpose in U. S. Patent to W. S. Barnickel No. 1,555,818, dated Oct. 6, 1925. A similar material, derived from a petroleum body and an aromatic, and used for a similar purpose, is described in U. S. Patent to Melvin De Groote No. 1,596,598, dated Aug. 17, 1926. Another prior patent which discloses the use of a treating agent or demulsifying agent of the same general type mentioned for the resolution of petroleum emulsions of the water-in-oil type, is U. S. Patent to Melvin De Groote and Wilbur C. Adams No. 1,641,804, dated Sept. 6, 1927, which describes a treating agent produced by introducing two detergent-forming radicals into an aromatic. German Patent No. 336,558, dated May 4, 1921, describes a method for producing substituted aromatic sulfonic acid, but said patent does not disclose the use of such a substance or material for the dehydration of petroleum emulsions.

In order that the distinction between our invention and the prior art may be clearly understood, we will state that the treating agent or demulsifying agent employed in our process is of different composition than the treating agents heretofore used in the resolution of petroleum emulsions of the water-in-oil type, and is produced by the introduction, preferably simultaneously, of an alcohol residue or alcohol residues having fewer than twelve carbon atoms each, together with a detergent-forming group or groups into an aromatic nucleus. The aromatic material may consist of naphthalene, anthracene, naphthacene, or other substances having similar properties. Instead of the unaltered aromatic body, derivatives may be employed, such as halogen derivatives, nitro derivatives, hydrogenated derivatives, or hydroxy derivatives. If desired, the sulfonic group may be introduced into the aromatic body before the introduction of the alcohol residues of the kind described; for instance, naphthalene sulfonic acid or beta naphthol sulfonic acid may be employed.

In a general way, the alcohol residues can be introduced into the aromatic nucleus by a number of methods. One method depends on the fact that these alcohols can be condensed with polycyclic aromatics by treating them with strong sulfonating agents, such as sulfuric acid, oleum, or chloro-sulfonic acid, preferably in excess at elevated temperatures, and especially in presence of a small quantity of a phosphorus compound such as phosphoric acid, or phosphorus oxychloride. During such condensing operation sulfonation of the aromatic hydrocarbon also takes place, thus producing a sulfonated substituted aromatic body. Said sulfonated substituted aromatic body can be treated with a detergent-forming material, preferably a fatty material, in presence of excess sulfonating agent, as sulfuric acid, to give the desired product. Another method is to employ the alcohol of fewer than twelve carbon atoms, plus the detergent-forming material in simultaneous sulfonation with the aromatic body. The most desirable method of production appears to be that of producing a Twitchell reagent as is used in the art of splitting fats. An aromatic body is mixed with the molecular proportion of a suitable fatty material and subjected to the action of sulfuric acid in excess. While this reaction is taking place, an alcohol of the kind described is treated with a sulfonating agent so as to produce an acid sulfate. When the two separate reactions are complete, the two masses are mixed, and further condensation takes place to produce the desired agent. It has been pointed out that two or more alcohol residues of the kind described can be introduced into the aromatic body and also that more than one detergent-forming residue can be introduced into the aromatic body. Likewise, it is possible that more than one sulfonic group could be introduced. Any suitable alcohol can be employed, such as methyl, ethyl, butyl, propyl, amyl, or hexyl.

We wish it to be understood that the above reaction is not limited to the introduction of an aliphatic alcohol in addition to the detergent-forming residue, but can also be applied to the introduction of a residue from an aromatic alcohol, such as hexahydrophenol. Likewise, aralkyl alcohols may be employed, such as benzyl alcohol or a cyclic alcohol may be employed, such as cyclobutanol. In the introduction of two or more alcohols of the kind noted, in addition to the detergent-forming residue, they need not be of the same kind; for instance, an aromatic alcohol, such as hexahydrophenol, and an arylkyl alcohol, such as benzyl alcohol, may be introduced in addition to the detergent-forming residue.

Another procedure that may be employed to produce materials suitable for use as the treating agent of our process, is to employ the well known Friedel and Craft reaction for introducing the substitution residue into the aromatic. Amyl alcohol may be converted by action of a suitable phosphorus halogen compound into a suitable amyl halide such as amyl chloride. This material can be treated with a suitable aromatic body in the presence of anhydrous aluminum chloride to give a substituted aromatic, and then by condensation with a fatty body and sulfonation, one obtains an aromatic sulfo-fatty acid of the Twitchell reagent type. The procedure just described, namely, that of Friedel and Craft, will not be described in detail, as it is possibly the best known reaction of aromatic chemistry.

Still another method of producing our treating agent is to dissolve the Twitchell reagent derived from some suitable material, such as naphthalene and oleic acid in an excess of sulfuric acid or other suitable material, and then introduce into same, a material such as ethylene, propylene, butylene, or amylene.

From the foregoing it will be understood that the treating agent, or demulsifying agent contemplated by our process can be manufactured or produced in various ways. Preferably, said agent is obtained by the action of excess sulfuric acid on molecular quantities of red oil and naphthalene, so as to produce a large proportion of stearo-naphthalene-sulfonic acid. In a separate sulfonator, propyl alcohol is reacted with an excess of sulfuric acid to produce propyl acid sulfate. The two acid masses are then mixed and allowed to stand at elevated temperatures, if required, until the sulfonated propylated stearo-naphthalene body is produced. The reaction involving the introduction of the sulfonic acid, of course, is well understood. The action of the propyl acid sulfate under conditions described is that it reacts with the aromatic body to produce substitution and split off sulfuric acid. The entrance of the fatty acid residue into the aromatic body is a similar reaction, in that sulfuric acid combines with oleic acid to give stearic acid hydrogen sulfate, which is in fact the sulfuric acid derivative of the corresponding fatty alcoholic body, namely, hydroxystearic acid. Said sulfuric acid derivative, that is, the acid sulfate of an alcohol having more than twelve carbon atoms, acts just the same as the acid sulfate of a one having fewer than twelve carbon atoms, that is, substitutes the residue for a hydrogen of the aromatic nucleus. When sulfonation is complete, the mass is diluted with water until an upper layer separates. The upper layer is drawn off and neutralized with any suitable base, such as caustic soda, caustic potash, or ammonia. We prefer to use ammonia.

The material above described can be employed as an acid mass to treat the emulsion, but this is not desirable, due to its corrosive effect. There is no objection to an excess of alkali, if desired. The material can also be converted into an ester by esterification in the usual manner to produce an aromatic or aliphatic ester such as the ethyl ester, such as the hexyl ester. Some of the ester so produced may be oil-soluble.

As indicated, the said material may be acidic in nature, and the complex substituted aromatic sulfonic group may be united with an acid hydrogen ion, as is the case when the acid itself is employed. When said acidic material is neutralized, the hydrogen ion is replaced by a suitable metallic ion equivalent, such as a true metallic ion or an ammonium radical. In the event that said material is esterified, the hydrogen ion is replaced by an organic radical, such as an ethyl radical. We will refer to the hydrogen ion or its metallic substitute, or its organic substitute as the hydrogen ion equivalent.

Material of the kind above described can be used as a demulsifying agent in an anhydrous state or in solutions of any convenient strength. A concentrated solution of said material can be emulsified into oil by agency of any suitable oil-soluble emulsifier, such as calcium oleate and used in this condition to treat the emulsion. Said material can be used alone to form the demulsifying agent of our process, or it can be combined with other well known treating agents for petroleum emulsions of the water-in-oil type, such as water-softeners, modified fatty bodies or their soaps, petroleum sulfonic acids or their soaps or other substances having similar properties.

In manufacturing or producing the treating agent employed in our process, we prefer to use only substances of the above class that yield insoluble precipitates with either soluble calcium or soluble magnesium salts, and we contemplate using only alcohols having fewer than twelve carbon atoms.

In practising our process a treating agent or demulsifying agent of the kind above described may be brought in contact with the emulsion to be treated in any of the numerous ways now employed in the treatment of petroleum emulsions of the water-in-oil type with chemical demulsifying agents, such, for example, as by introducing the treating agent into the well in which the emulsion is produced; introducing the treating agent into a conduit through which the emulsion is flowing; introducing the treating agent into a tank in which the emulsion is stored, or introducing the treating agent into a container that holds a sludge obtained from the bottom of an old storage tank. In some instances it may be advisable to introduce the treating agent into a producing well in such a way that it will become mixed with water and oil that are emerging from the surrounding strata, before said water and oil enter the barrel of the well pump or the tubing up through which said water and oil flow to the surface of the ground. After treatment the emulsion is allowed to stand in a quiescent state, usually in a settling tank, at a temperature varying from atmospheric temperature to about 200° F., so as to permit the water or brine to separate from the oil, it being preferable to keep the temperature low enough so as to prevent the valuable constituents of the oil from volatilizing. If desired, the treated emulsion may be acted upon by one or the other of various kinds of apparatus now used in the operation of breaking petroleum emulsions, such as homogenizers, hay tanks, gun barrels, filters, centrifuges or electrical dehydrators.

The amount of treating agent on the anhydrous basis that is required to break the emulsion may vary from approximately 1 part of treating agent to 500 parts of emulsion, up to a ratio of 1 part of treating agent to 20,000 parts of emulsion, depending upon the type or kind of emulsion being treated. In treating exceptionally refractory emulsions of the kind commonly referred to as "tank bottoms" or "residual pit oils," the minimum ratio above referred to is often necessary, but in treating fresh emulsions, i. e., emulsions that will yield readily to the action of chemical demulsifying agents, the maximum ratio above mentioned will frequently produce highly satisfactory results. For the average petroleum emulsion of the water-in-oil type a ratio of 1 part of treating agent to 5,000 parts of emulsion will usually be found to produce commercially satisfactory results.

Having thus described our invention, what we claim as new and desire to secure by Letters Patent of the United States is:

1. A process for breaking a petroleum emulsion of the water-in-oil type, which consists in subjecting the emulsion to the action of a demulsifying agent, containing a substituted aromatic detergent-forming sulfonic body of the type X F R $SO_3$ Z; wherein X is a polycyclic aromatic nucleus; F a detergent-forming organic residue, R, an alcohol residue derived from an alcohol of fewer than twelve carbon atoms and substituted in the aromatic ring; $SO_3$ represents the conventional sulfonic acid residue; and Z represents an hydrogen ion equivalent.

2. A process for breaking a petroleum emulsion of the water-in-oil type, which consists in subjecting the emulsion to the action of a water-soluble demulsifying agent containing a substituted aromatic detergent-forming sulfonic body of the type X F R $SO_3$ Z; wherein X is a polycyclic aromatic nucleus; F a detergent-forming organic residue; R an alcohol residue derived from an alcohol of fewer than twelve carbon atoms and substituted in the aromatic ring; $SO_3$ represents the conventional sulfonic acid residue; and Z represents an hydrogen ion equivalent.

3. A process for breaking a petroleum emulsion of the water-in-oil type, which consists in subjecting the emulsion to the action of a water-soluble demulsifying agent containing a substituted aromatic detergent-forming sulfonic body of the type X F R $SO_3$ Z; wherein X is a polycyclic aromatic nucleus; F a detergent-forming organic residue; R an alcohol residue derived from an alcohol of fewer than twelve carbon atoms and substituted in the aromatic ring; $SO_3$ represents the conventional sulfonic acid residue; and Z represents a metallic ion equivalent.

4. A process for breaking a petroleum emulsion of the water-in-oil type, which consists in subjecting the emulsion to the action of a water-soluble demulsifying agent containing a substituted aromatic detergent-forming sulfonic body of the type X F R $SO_3$ Z; wherein X is a polycyclic aromatic nucleus; F a detergent-forming organic residue; R an alcohol residue derived from an alcohol of fewer than twelve carbon atoms and substituted in the aromatic ring; $SO_3$ represents the conventional sulfonic acid residue; and Z represents an ammonium radical.

5. A process for breaking a petroleum emulsion of the water-in-oil type, which consists in subjecting the emulsion to the action of a demulsifying agent containing a substituted bicyclic aromatic detergent-forming sulfonic body of the type X F R $SO_3$ Z; wherein X is a bicyclic aromatic nucleus; F a detergent-forming organic residue; R an alcohol residue derived from an alcohol of fewer than twelve carbon atoms and substituted in the aromatic ring; $SO_3$ represents the conventional sulfonic acid residue; and Z represents an hydrogen ion equivalent.

6. A process for breaking a petroleum emulsion of the water-in-oil type, which consists in subjecting the emulsion to the action of a water-soluble demulsifying agent containing a substituted bicyclic aromatic detergent-forming sulfonic body of the type X F R $SO_3$ Z; wherein X is a bicyclic aromatic nucleus; F a detergent-forming organic residue; R an alcohol residue derived from an alcohol of fewer than twelve carbon atoms and substituted in the aromatic ring; $SO_3$ represents the conventional sulfonic acid residue; and Z represents an hydrogen ion equivalent.

7. A process for breaking a petroleum emulsion of the water-in-oil type, which consists in subjecting the emulsion to the action of a water-soluble demulsifying agent containing a substituted bicyclic aromatic detergent-forming sulfonic body of the type X F R $SO_3$ Z; wherein X is a bicyclic aromatic nucleus; F a detergent-forming organic residue; R an alcohol residue derived from an alcohol of fewer than twelve carbon atoms and substituted in the aromatic ring; $SO_3$ represents the conventional sulfonic acid residue; and Z represents a metallic ion equivalent.

8. A process for breaking a petroleum emulsion of the water-in-oil type, which consists in subjecting the emulsion to the action of a water-soluble demulsifying agent containing a substituted bicyclic aromatic detergent-forming sulfonic body of the type X F R $SO_3$ Z; wherein X is a bicyclic nucleus; F a detergent-forming organic residue; R an alcohol residue derived from an alcohol of fewer than twelve carbon atoms and substituted in the aromatic ring; $SO_3$ represents the conventional sulfonic acid residue; and Z represents an ammonium radical.

9. A process for breaking a petroleum emulsion of the water-in-oil type, which consists in subjecting the emulsion to the action of a demulsifying agent containing a substituted bicyclic aromatic detergent-forming sulfonic body of the type X F R $SO_3$ Z; wherein X is a bicyclic aromatic nucleus; F a fatty acid residue; R an alcohol residue derived from an alcohol of fewer than twelve carbon atoms and substituted in the aromatic ring; $SO_3$ represents the conventional sulfonic acid residue; and Z represents an hydrogen ion equivalent.

10. A process for breaking a petroleum emulsion of the water-in-oil type, which consists in subjecting the emulsion to the action of a water-soluble demulsifying agent containing a substituted bicyclic aromatic detergent-forming sulfonic body of the type X F R $SO_3$ Z; wherein X is a bicyclic aromatic nucleus; F a fatty acid residue; R an alcohol residue derived from an alcohol of fewer than twelve carbon atoms and substituted in the aromatic ring; $SO_3$ represents the conventional sulfonic acid residue; and Z represents an hydrogen ion equivalent.

11. A process for breaking a petroleum emulsion of the water-in-oil type, which consists in subjecting the emulsion to the action of a water-soluble demulsifying agent containing a substituted bicyclic aromatic detergent-forming sulfonic body of the type X F R SO₃ Z; wherein X is a bicyclic aromatic nucleus; F a fatty acid residue; R an alcohol residue derived from an alcohol of fewer than twelve carbon atoms and substituted in the aromatic ring; SO₃ represents the conventional sulfonic acid residue; and Z represents a metallic ion equivalent.

12. A process for breaking a petroleum emulsion of the water-in-oil type, which consists in subjecting the emulsion to the action of a water-soluble demulsifying agent containing a substituted bicyclic aromatic detergent-forming sulfonic body of the type X F R SO₃ Z; wherein X is a bicyclic aromatic nucleus; F a fatty acid residue; R an alcohol residue derived from an alcohol of fewer than twelve carbon atoms and substituted in the aromatic ring; SO₃ represents the conventional sulfonic acid residue; and Z represents an ammonium radical.

13. A process for breaking a petroleum emulsion of the water-in-oil type, which consists in subjecting the emulsion to the action of a demulsifying agent containing a substituted bicyclic aromatic detergent-forming sulfonic body of the type X F R SO₃ Z; wherein X is a bicyclic aromatic nucleus; F an hydroxy stearic acid residue; R an alcohol residue derived from an alcohol of fewer than twelve carbon atoms and substituted in the aromatic ring; SO₃ represents the conventional sulfonic acid residue; and Z represents an hydrogen ion equivalent.

14. A process for breaking a petroleum emulsion of the water-in-oil type, which consists in subjecting the emulsion to the action of a water-soluble demulsifying agent containing a substituted bicyclic aromatic detergent-forming sulfonic body of the type X F R SO₃ Z; wherein X is a bicyclic aromatic nucleus; F an hydroxy stearic acid residue; R an alcohol residue derived from an alcohol of fewer than twelve carbon atoms and substituted in the aromatic ring; SO₃ represents the conventional sulfonic acid residue; and Z represents an hydrogen ion equivalent.

15. A process for breaking a petroleum emulsion of the water-in-oil type, which consists in subjecting the emulsion to the action of a water-soluble demulsifying agent containing a substituted bicyclic aromatic detergent-forming sulfonic body of the type X F R SO₃ Z; wherein X is a bicyclic aromatic nucleus; F an hydroxy stearic acid residue; R an alcohol residue derived from an alcohol of fewer than twelve carbon atoms and substituted in the aromatic ring; SO₃ represents the conventional sulfonic acid residue; and Z represents a metallic ion equivalent.

16. A process for breaking a petroleum emulsion of the water-in-oil type, which consists in subjecting the emulsion to the action of a water-soluble demulsifying agent containing a substituted bicyclic aromatic detergent-forming sulfonic body of the type X F R SO₃ Z; wherein X is a bicyclic aromatic nucleus; F an hydroxy stearic acid residue; R an alcohol residue derived from an alcohol of fewer than twelve carbon atoms and substituted in the aromatic ring; SO₃ represents the conventional sulfonic acid residue; and Z represents an ammonium radical.

17. A process for breaking a petroleum emulsion of the water-in-oil type, which consists in subjecting the emulsion to the action of a demulsifying agent containing a substituted bicyclic aromatic detergent-forming sulfonic body of the type X F R SO₃ Z; wherein X is a bicyclic aromatic nucleus; F an hydroxy stearic acid residue; R a propyl alcohol residue substituted in the aromatic ring; SO₃ represents the conventional sulfonic acid residue; and Z represents an hydrogen ion equivalent.

18. A process for breaking a petroleum emulsion of the water-in-oil type, which consists in subjecting the emulsion to the action of a water-soluble demulsifying agent containing a substituted bicyclic aromatic detergent-forming sulfonic body of the type X F R SO₃ Z; wherein X is a bicyclic aromatic nucleus; F an hydroxy stearic acid residue; R a propyl alcohol residue substituted in the aromatic ring; SO₃ represents the conventional sulfonic acid residue; and Z represents an hydrogen ion equivalent.

19. A process for breaking a petroleum emulsion of the water-in-oil type, which consists in subjecting the emulsion to the action of a water-soluble demulsifying agent containing a substituted bicyclic aromatic detergent-forming sulfonic body of the type X F R SO₃ Z; wherein X is a bicyclic aromatic nucleus; F an hydroxy stearic acid residue; R a propyl alcohol residue substituted in the aromatic ring; SO₃ represents the conventional sulfonic acid residue; and Z represents a metallic ion equivalent.

20. A process for breaking a petroleum emulsion of the water-in-oil type, which consists in subjecting the emulsion to the action of a water-soluble demulsifying agent containing a substituted bicyclic aromatic detergent-forming sulfonic body of the type X F R SO₃ Z; wherein X is a bicyclic aromatic nucleus; F an hydroxy stearic acid residue; R a propyl alcohol residue substituted in the aromatic ring; SO₃ represents the conventional sulfonic acid residue; and Z represents an ammonium radical.

MELVIN DE GROOTE.
LOUIS T. MONSON.
ARTHUR F. WIRTEL.